US00RE42234E

(19) United States
(12) Reissued Patent
Chiu

(10) Patent Number: US RE42,234 E
(45) Date of Reissued Patent: Mar. 22, 2011

(54) MULTIPLE NON-DIRECTIONAL SCANNING

(75) Inventor: Hui-Hsien Chiu, Boashan Township (TW)

(73) Assignee: Transpacific Systems, LLC, Taipei (TW)

(21) Appl. No.: 11/283,477

(22) Filed: Nov. 18, 2005

Related U.S. Patent Documents

Reissue of:
(64) Patent No.: 6,650,442
Issued: Nov. 18, 2003
Appl. No.: 09/618,598
Filed: Jul. 17, 2000

(30) Foreign Application Priority Data

Mar. 6, 2000 (TW) ..... 89103947

(51) Int. Cl.
*H04N 1/04* (2006.01)

(52) U.S. Cl. ..... 358/474; 358/496; 358/497; 358/471; 358/498; 250/208.1

(58) Field of Classification Search ..... 358/474, 358/497, 472, 486, 471, 406, 504
See application file for complete search history.

(56) References Cited

U.S. PATENT DOCUMENTS 4,730,930 A * 3/1988 Thoreson et al. ..... 356/407
5,721,624 A * 2/1998 Kumashiro et al. ..... 358/450
6,388,778 B1 * 5/2002 Ko-Chien ..... 358/497
6,650,441 B1 * 11/2003 Horigome et al. ..... 358/474

* cited by examiner

*Primary Examiner*—Houshang Safaipour
(74) *Attorney, Agent, or Firm*—Stolowitz Ford Cowger LLP

(57) ABSTRACT

A multiple non-directional scanning method. A document preview scanning is carried out from one end of the document to the other. The preview image is next analyzed to provide a set of scan parameters. After setting the scan parameters, the scanner performs a backward scanning operation from the other end of the document back to the original start-up position to obtain a final scan image.

27 Claims, 3 Drawing Sheets

MULTIPLE NON-DIRECTIONAL SCANNING

Matter enclosed in heavy brackets [ ] appears in the original patent but forms no part of this reissue specification; matter printed in italics indicates the additions made by reissue.

CROSS-REFERENCE TO RELATED APPLICATION

This application claims the priority benefit of Taiwan application serial no. 89103947, filed Mar. 6, 2000.

BACKGROUND OF THE INVENTION

1. Field of Invention

The present invention relates to a method of operating a scanner. More particularly, the present invention relates to a multiple non-directional document scanning.

2. Description of Related Art

Due to rapid advance in computer technologies and multimedia systems, personal computers has become indispensable in our daily life. Other peripheral components related to our computer system are also developed simultaneously. For example, progress in image-processing techniques has lead to innovative image processors and scanners. In just a few years time, black-and-white palm-top type of scanners has become obsolete and replaced by full-color high-resolution type. Hence, the scanned image is more precise and real.

FIG. 1 is a perspective view of a conventional scanner. The scanner has a covering flap 10 and an external housing. The external housing can be further divided into a top casing 20 and a bottom casing 30. The top casing 20 includes a transparent glass panel 40. Scan document is placed between the covering flap 10 and the top casing 20. To scan a document, an image of the document passes through the transparent glass panel 40 to be picked up by a chassis. The chassis has optical sensor mounted thereon for receiving optical signals and transforming the optical signals into electrical signals of the image.

FIG. 2A is a sketch showing the top casing of a conventional scanner. Inside the top casing 20, there is a calibration ruler 60. The calibration ruler 60 is a reference for performing optical black and white chart calibration before an actual scanning using the chassis. The results from the calibration can be used to group various colors on a scan document. FIG. 2B is a sketch of the calibration ruler. The calibration ruler 60 has two colored regions, namely, the optical black region 64 and the white chart 62.

FIG. 3 is a flow chart showing the steps in operating a conventional scanner. As soon as a scan document is placed inside the scanner and the scan button triggered, the scanner first performs a calibration (in step 70). Scan parameters are next set (in step 80). Thereafter, the chassis is moved to the beginning of a document and started scanning so that ultimately a full image of the document is obtained (in step 90). After the completion of the scanning operation, the chassis has moved to the other side of the scanner. Hence, the driving motor must reverse direction of rotation so that the chassis is returned to the original position where the calibration ruler is located. This is the home-park operation (step 100). Once the chassis has returned to the home-park position, another document-scanning operation can be triggered.

Each document has to cycle through the calibration step 70, parameter setting step 80, image scanning step 90 and parking step 100. Hence, a lot of time is wasted in non-scanning preparations, lengthening the entire process of scanning multiple documents or a batch of documents.

SUMMARY OF THE INVENTION

Accordingly, one object of the present invention is to provide a multiple document non-directional scanning method that utilizes a program whose parameters are set according to user. The program controls the scanning direction so that optimal scanning can be conducted in both the forward and the backward directions. Hence, scanning operations such as batch scanning, preview and scanning can be completed in one cycle and a low-resolution forward/backward scanning can be used to obtain a high-resolution full-color image. Moreover, this invention eliminates the need for a home-park operation at the end of each document scanning so that the next round of scanning can start immediately. Therefore, a greater number of images can be captured within a given time.

To achieve these and other advantages and in accordance with the purpose of the invention, as embodied and broadly described herein, the invention provides a multiple non-directional scanning method. First, a document preview scanning is carried out from one end of the document to the other. The preview image is next analyzed to provide a set of scan parameters. After setting the scan parameters, the scanner performs a backward scanning operation from the other end of the document back to the original start-up position to obtain a final scan image.

This invention also provides a second multiple non-directional scanning method. First, the image of a first portion of a document is obtained as the chassis moves forward. Thereafter, the image of a second portion of the document is obtained as the chassis moves backward. Note that the image captured from the second portion of the document has no overlapping with the image captured from the first portion of the document image. Ultimately, the first and the second image are combined to form a final scan image.

This invention also provides a third multiple non-directional scanning method suitable for the scanning of a portion of each document consecutively. First, the image of a portion of a document is scanned. Thereafter, the scanner checks if there is any more scanning operation. If there is some more scanning to perform, the scanner decides if the next partial scanning of document is in the forward or the backward direction.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
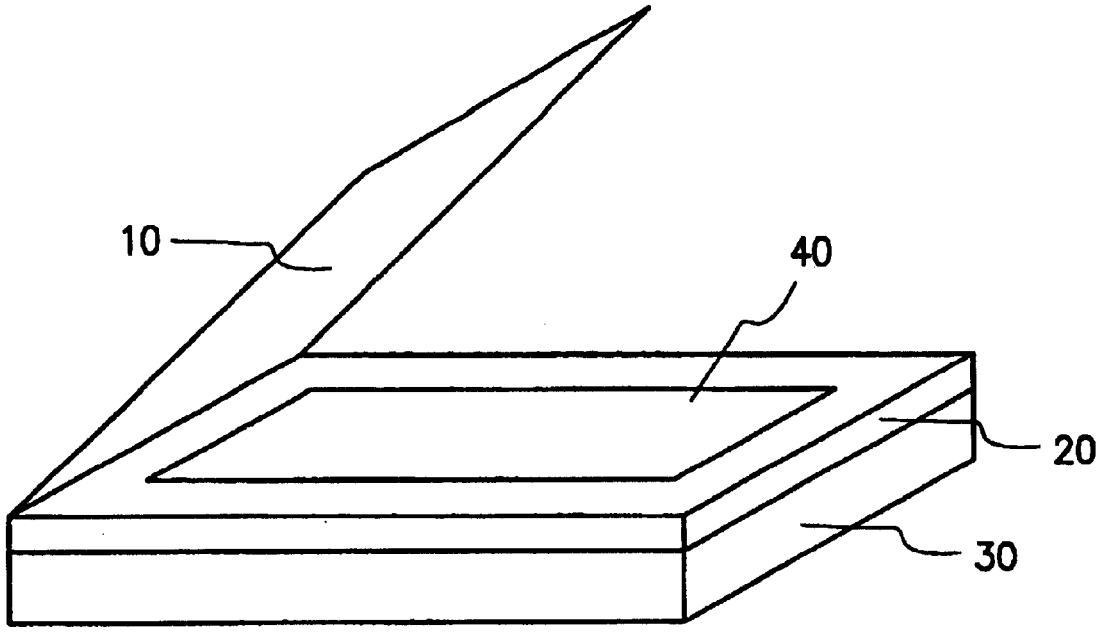
FIG. 1 (PRIOR ART)
FIG. 1 is a perspective view of a conventional scanner.
Figure 2A:
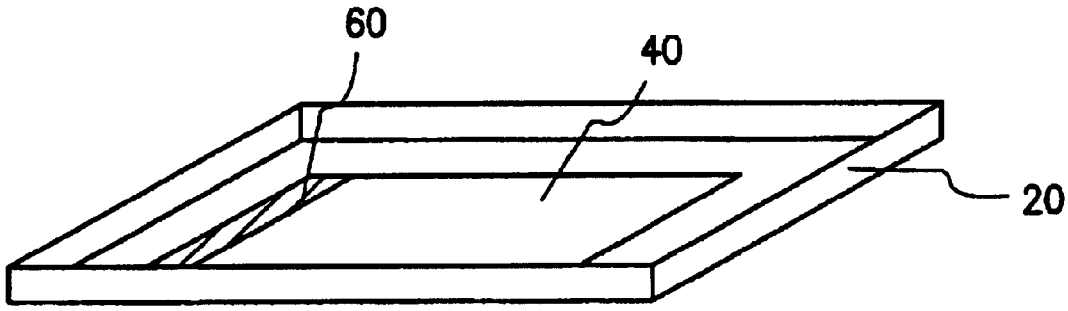
FIG. 2A (PRIOR ART)
FIG. 2A is a sketch showing the top casing of a conventional scanner.
Figure 2B:
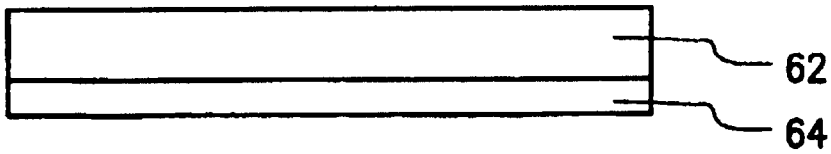
FIG. 2B (PRIOR ART)
FIG. 2B is a sketch of the calibration ruler.
Figure 3:
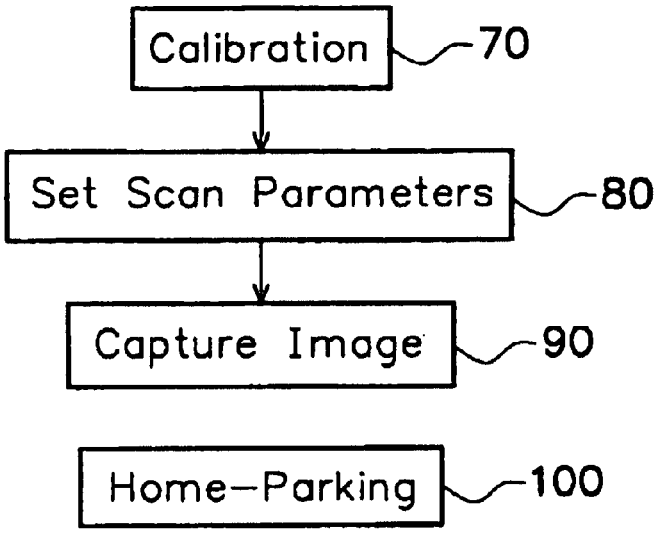
FIG. 3 is a flow chart showing the steps in operating a conventional scanner.

Reference will now be made in detail to the present preferred embodiments of the invention, examples of which are illustrated in the accompanying drawings. Wherever possible, the same reference numbers are used in the drawings and the description to refer to the same or like parts.

In this invention, a control program is used to carry out a multiple of non-directional scanning operations. A conventional scanner has to return the chassis to the parking position at the end of a scanning operation and has to calibrate before the next scanning operation. Hence, the total time spent preparing the scanner will increase in proportional to the number of scan documents. Since the calibration parameters are almost identical when a batch of documents is scanned, repetitive calibration is redundant. By eliminating the calibration, home parking of the chassis after each scanning becomes unnecessary and document scanning can initiate from whatever direction.

Figure 4:
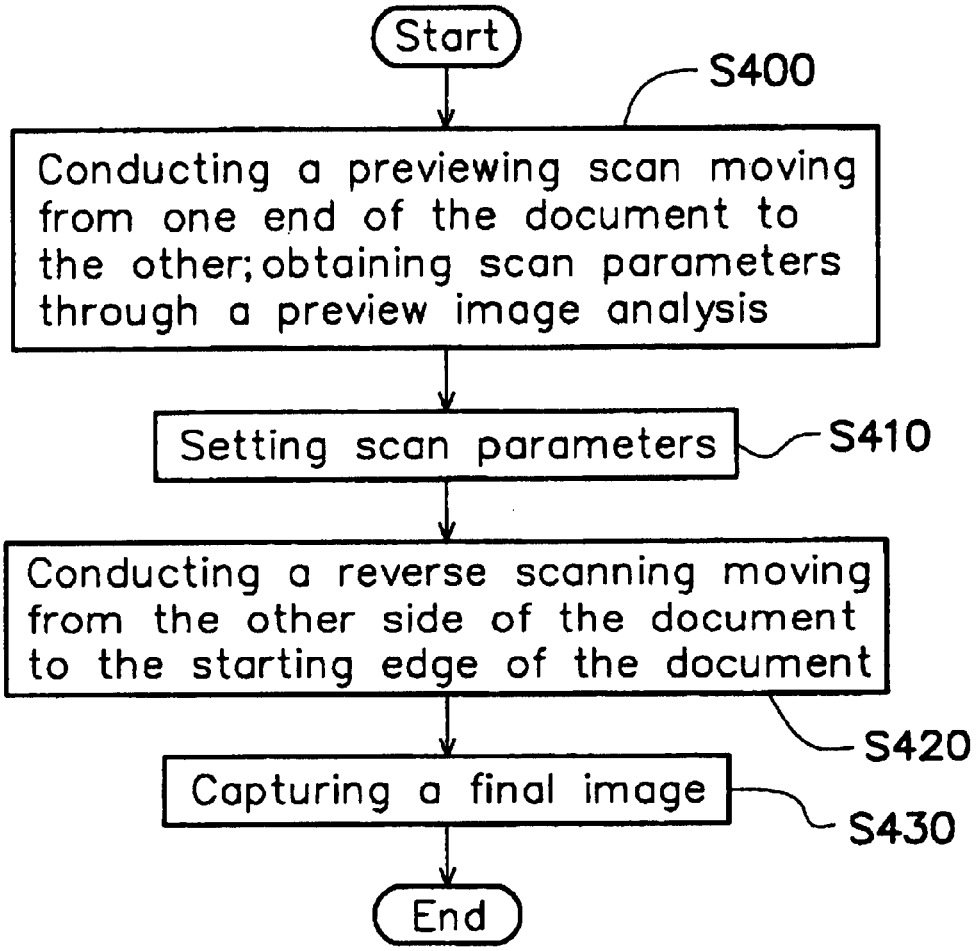
FIG. 4 is a flow chart showing the steps in operating a multiple non-directional scanner according to a first preferred document of this invention.

FIG. 4 is a flow chart showing the steps in operating a multiple non-directional scanner according to a first preferred document of this invention. First, a document preview scanning is carried out from one end of the document to the other. The preview image is next analyzed to provide a set of scan parameters for subsequent scanning operation (in step S400). After setting the scan parameters (in step S410), the scanner performs a backward scanning operation (in step S420) from the other end of the document back to the original start-up position to obtain a final scan image (in step S430).

In the first embodiment of this invention, since the scanner has a preview function, scanner parameters needed for subsequent scanning can be obtained when the chassis moves forward and a final image can be obtained when the chassis moves backward. Hence, a final image is obtained through a single forward/backward movement of the chassis.

Figure 5:
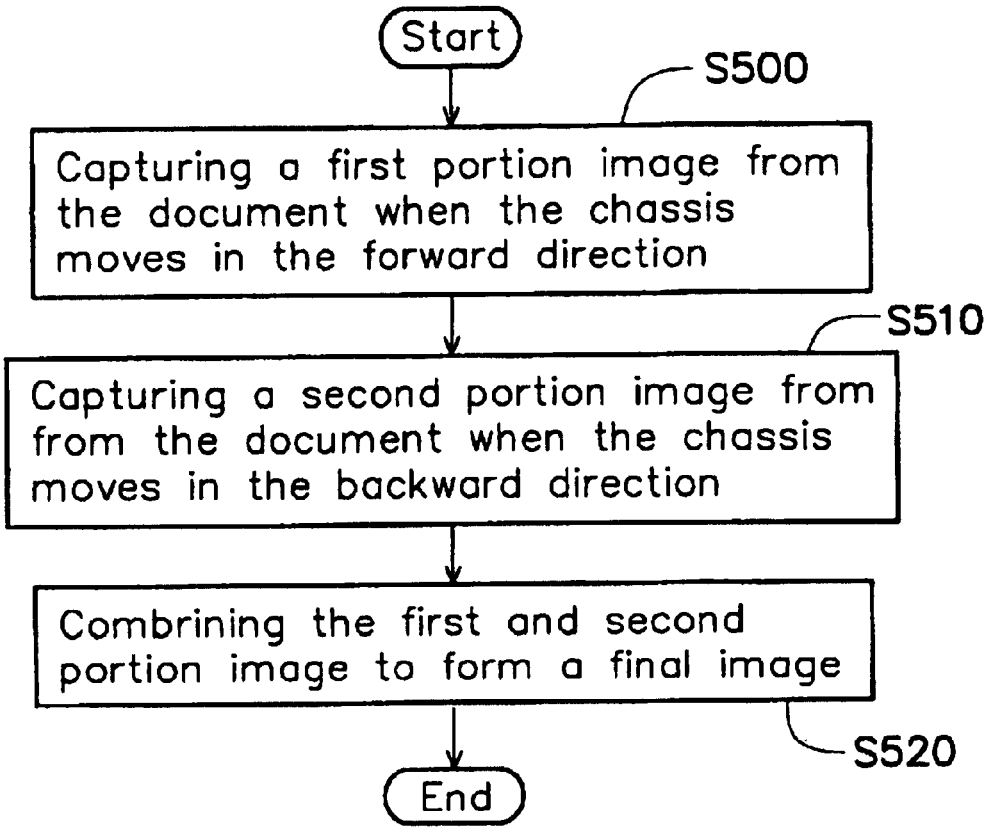
FIG. 5 is a flow chart showing the steps in operating a multiple non-directional scanner according to a second preferred document of this invention.

FIG. 5 is a flow chart showing the steps in operating a multiple non-directional scanner according to a second preferred document of this invention. First, the image of a first portion of a document is obtained as the chassis moves forward (in step S500). Thereafter, the image of a second portion of the document is obtained as the chassis moves backward (in step S510). Ultimately, the first and the second image are combined to form a final scan image (in step S520).

Note that in the second embodiment of this invention, the image captured from the second portion of the document should have no overlapping with the image captured from the first portion of the document image. The reason for removing any overlapping is to minimize data processing. However, if data processing rate is not a major consideration, this requirement can be relaxed. To eliminate any overlapping between the first portion and the second portion of the document, alternate image points on a line can be sampled or image points on alternate lines can be sampled, for example. In practice, the sampling method is not restricted as such. In other words, the odd or the even image points on a line may be extracted in the forward direction to form the first portion image and the even or the odd image points on the line may be extracted in the backward direction to form the second portion image. Alternatively, the odd or the even image lines may be extracted in the forward direction to form the first portion image and the even or the odd image lines may be extracted in the backward direction to form the second portion image.

Obviously, extraction of image points or pixels to form the first portion image or the second portion image are not limited to alternative sampling pattern. As long as rules for image sampling are followed, the number of points or lines skipped in the first or second sampling is irrelevant in this invention. One major advantage of this invention is in full-color scanning. A conventional scanner requires a lot of time to capture a full-color image. In this invention, a lot of time is saved in full-color scanning operation. For example, when the scanner demands a full-color 600 dpi resolution scanning, optical sensor on the chassis can choose to scan the odd pixels in the forward direction so that a 300 dpi resolution is obtained. On reversing the direction of movement, the optical sensor can choose to scan the even pixels so that a 300 dpi resolution is again obtained. By combining the two images extracted from two scanning movements, a full-color 600 dpi resolution is obtained. Hence, time to obtain a full-color image with 600 dpi resolution is cut by half.

Figure 6:
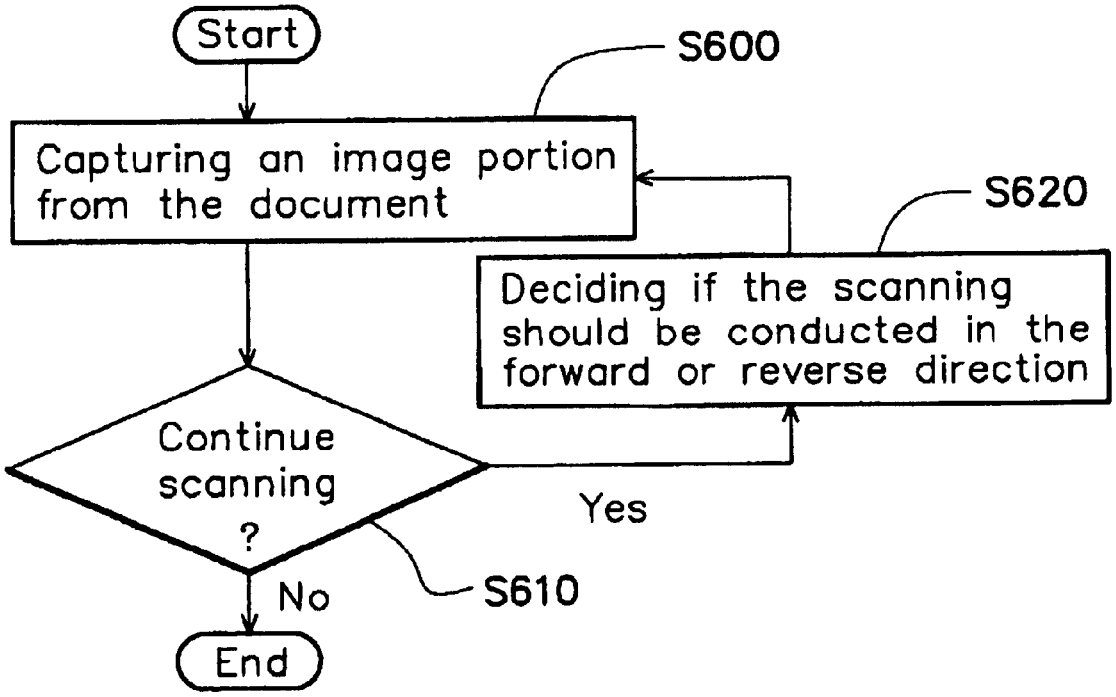
FIG. 6 is a flow chart showing the steps in operating a multiple non-directional scanner according to a third preferred document of this invention.

FIG. 6 is a flow chart showing the steps in operating a multiple non-directional scanner according to a third preferred document of this invention. The third embodiment of this invention is suitable for the scanning of a portion of each document consecutively. First, the image of a portion of a document is scanned (in step S600). Thereafter, the scanner checks if there is any more scanning operation (in step S610). If there is no more scanning operation, the scanning program terminates. However, if there is some more scanning to perform, the scanner decides if the next partial scanning operation of the next document is in the forward or the backward direction (in step 620). Once the direction of scanning for the next document has been decided, the program will drive the chassis to appropriate location above the scanning document. Another scanning operation (in step S600) is initiated to capture that particular portion of the document.

In the conventional method, when several scan documents are placed inside a scan window to carry out batch scanning, the chassis has to return to the parking position after each scanning and re-calibrate before the next scanning can start. Assume, for example, that two scan documents are placed above the transparent glass panel of a scanner. After a first calibration, the scanner moves to the first scan document and perform a first scanning operation to extract a first image. The chassis has to return to the parking position before moving to the second document position to start extracting a second image. After the second image extraction, the chassis returns to the parking position. Hence, the chassis has to move forward and backward twice in order to calibrate. In this invention, the chassis moves to the first document position to performing the first image extraction after the first calibration, and then the chassis moves on to the other side of the scanner. When the chassis moves in a reverse direction, the second document is scanned to extract the second image. With this scheme of movement, scanning time can be considerably reduced. The benefits of this scanning mode is more obvious when a large quantity of scan documents are present.

In summary, this invention provides a multiple document non-directional scanning method that utilizes a program whose parameters are set according to user. The program controls the scanning direction so that optimal scanning can be conducted in both the forward and the backward directions. Hence, scanning operations such as batch scanning, preview and scanning can be completed in one cycle and a low-resolution forward/backward scanning can be used to obtain a high-resolution full-color image. Moreover, this invention eliminates the need for a home-park operation at the end of each document scanning so that the next round of scanning can start immediately. Therefore, a greater number of images can be captured within a given time. In addition, the scanning method is capable of minimizing scanning time and simplifying procedural control.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A [multiple non-directional scanning] method [for a scanner,] comprising [the steps of]:

capturing a first portion image from a document as [the] *a* chassis moves forward;

capturing a second portion image from the document as the chassis moves backward *over at least a portion of the document corresponding to the first portion image*, wherein the first portion image and the second portion image [has] *have* no overlapping sections; and combining the first *portion image* and the second *portion* image to form a final scan image.

2. The method of claim 1, wherein [the step of] capturing the first portion image includes sampling alternative pixel points from the document as image data.

3. The method of claim 1, wherein [the step of] capturing the first *portion image* and the second portion image includes sampling the odd pixel points and the even pixel points respectively.

4. The method of claim 1, wherein [the step of] capturing the first *portion image* and the second portion image includes sampling the even pixel points and the odd pixel points respectively.

5. The method of claim 1, wherein [the step of] capturing the first portion image includes sampling alternative pixel lines from the document as image data.

6. The method of claim 5, wherein [the step of] capturing the first *portion image* and the second portion image includes sampling the odd pixel lines and the even pixel lines respectively.

7. The method of claim 5, wherein [the step of] capturing the first *portion image* and the second portion image includes sampling the even pixel lines and the odd pixel lines respectively.

8. A [multiple non-directional scanning] method [for a scanner suitable for the scanning of a portion of each document consecutively,] comprising [the steps of]:

scanning *at least* a portion of a document[;] *by:*

[deciding if there is anymore scanning operation; and]

[deciding if the next scanning of document is in the forward or the backward direction when more scanning is needed,]

[wherein when scanning a portion of the document, scanning steps comprises:]

capturing a first portion image from [a] *the* document as [the] *a* chassis moves forward;

capturing a second portion image from the document as the chassis moves backward *over at least a portion of the document corresponding to the first portion image*, wherein the first portion image and the second portion image [has] *have* no overlapping sections; and combining the first *portion image* and the second *portion* image to form a final scan image.

9. The method of claim 8, [wherein the step of] *further comprising* deciding if more scanning is required [is] based on [the] *a* scanning state of at least one of [the] *multiple* documents.

*10. An apparatus, comprising:*

*a scanner configured to capture a first portion image from a document during a scan in a first direction, and to capture a second portion image from the document during a scan in a second direction, wherein the scans in the first and the second directions are performed over at least one common portion of the document, and wherein the first portion image and the second portion image comprise no overlapping sections.*

*11. The apparatus of claim 10, wherein the scanner is further configured to combine the first portion image and the second portion image to form a final scan image.*

*12. The apparatus of claim 10, wherein said capture of the first portion image includes a sample of alternative pixel points from the document as image data.*

*13. The apparatus of claim 10, wherein said capture of the first portion image and the second portion image includes a sample of odd pixel points and even pixel points, respectively.*

*14. The apparatus of claim 10, wherein said capture of the first portion image and the second portion image includes a sample of even pixel points and odd pixel points, respectively.*

*15. The apparatus of claim 10, wherein said capture of the first portion image includes a sample of alternative pixel lines from the document as image data.*

*16. The apparatus of claim 15, wherein said capture of the first portion image and the second portion image includes a sample of odd pixel lines and even pixel lines, respectively.*

*17. The apparatus of claim 15, wherein said capture of the first portion image and the second portion image includes a sample of even pixel lines and odd pixel lines, respectively.*

*18. A method, comprising:*

*capturing a first portion image from a document during a scan in a first direction; and*

*capturing a second portion image from the document during a scan in a second direction, wherein the scans in the first and the second directions are performed over at least one common portion of the document, and wherein the first portion image and the second portion image comprise no overlapping sections.*

*19. The method of claim 18, wherein said capturing the first portion image includes sampling alternative pixel points from the document as image data.*

*20. The method of claim 18, wherein said capturing the first portion image and the second portion image include sampling odd pixel points and even pixel points, respectively.*

*21. The method of claim 18, wherein said capturing the first portion image and the second portion image include sampling even pixel points and odd pixel points, respectively.*

*22. The method of claim 18, wherein said capturing the first portion image includes sampling alternative pixel lines from the document as image data.*

*23. The method of claim 22, wherein said capturing the first portion image and the second portion image includes sampling odd pixel lines and even pixel lines, respectively.*

*24. The method of claim 22, wherein said capturing the first portion image and the second portion image includes sampling even pixel lines and odd pixel lines, respectively.*

*25. A method, comprising:*

*scanning at least a portion of a document by:*

*capturing a first portion image from the document during a forward scan over the portion of the document;*

*capturing a second portion image from the document during a backward scan over the same portion of the document, wherein the first portion image and the second portion image comprise no overlapping sections; and*

*combining the first portion image and the second portion image to form a final scan image.*

*26. The method of claim 25, further comprising:*

*determining to perform additional scanning operations on the document; and*

*deciding a next scanning of the document is in the forward direction or the backward direction;*

*scanning at least another portion of the document in the forward direction or the backward direction based on the decision.*

*27. The method of claim 26, wherein said determining to perform additional scanning operations on the document is based on a scanning state of at least one of multiple documents.*

* * * * *